United States Patent Office 2,767,121
Patented Oct. 16, 1956

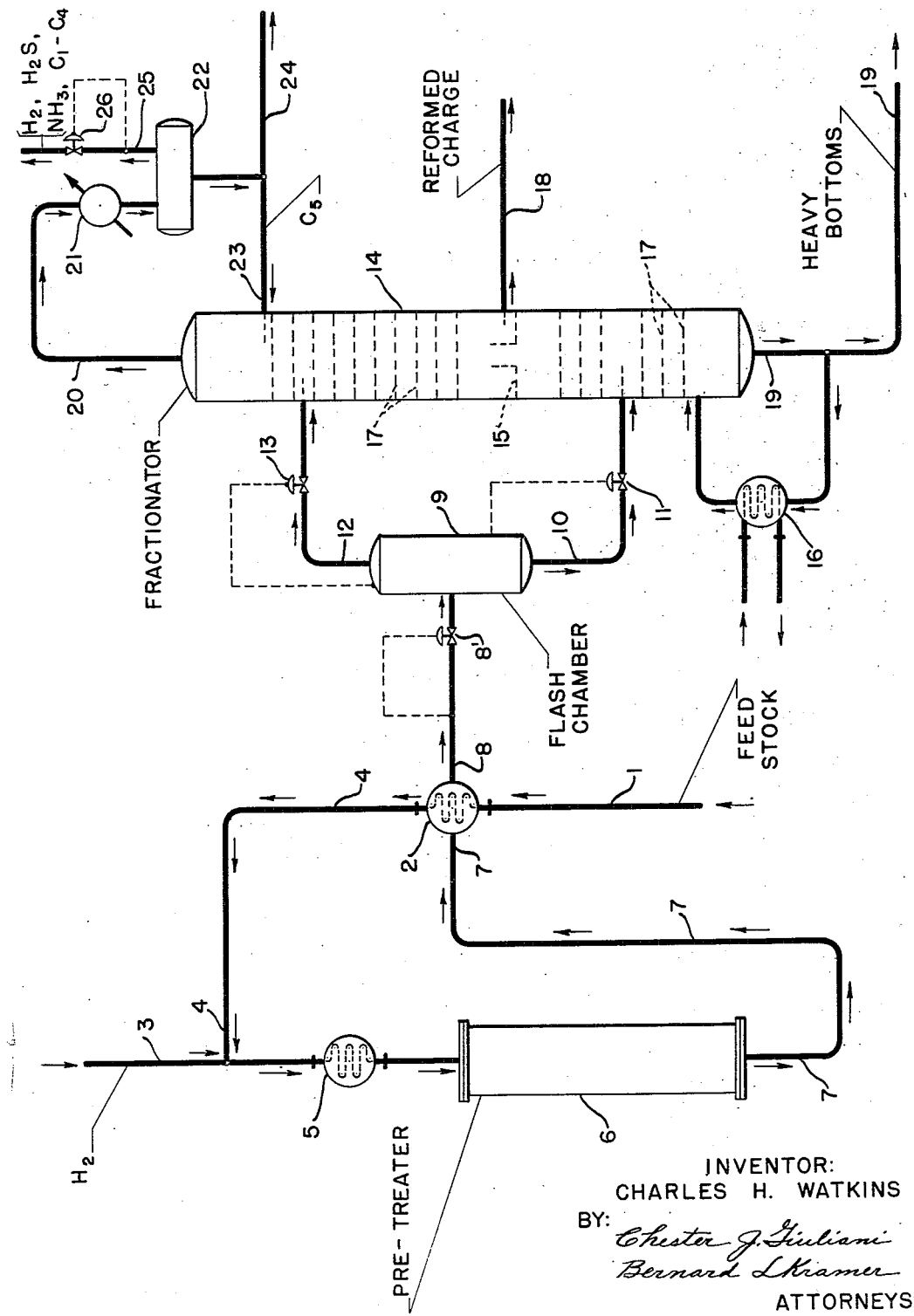

2,767,121

PROCESS FOR PRE-TREATING REFORMER FEED STOCKS WITH HYDROGEN

Charles H. Watkins, Western Springs, Ill., assignor to Universal Oil Products Company, Chicago, Ill., a corporation of Delaware Application September 24, 1952, Serial No. 311,219

3 Claims. (Cl. 196—24)

This invention relates to an improved process and apparatus for pre-treating feed stocks to remove contaminants therefrom.

In particular, this invention relates to a process and apparatus for catalytically treating reformer feed stocks to remove contaminants which act as poisons to the catalyst in a subsequent reforming process.

It is particularly desirable to reform straight run gasoline, natural gasoline, and/or cracked naphtha fractions to improve their antiknock characteristics, particularly the higher boiling fractions thereof. It has been found that catalytic reforming utilizing a catalyst comprising platinum and alumina, and particularly platinum-alumina catalyst containing halogen such as fluorine and/or chlorine, are especially useful in the reforming of hydrocarbons. This type of catalyst effects desirable combined reactions including hydrocracking and isomerization of paraffins, dehydrogenation of naphthenes to aromatics, and is thus particularly capable of increasing the octane number of such gasoline fractions. The resulting octane numbers are substantially higher than those that ordinarily can be obtained by thermal reforming. By appropriate selection of operating conditions, catalysts of this type may be used for a relatively long period of time when processing gasoline fractions that are relatively free of contaminants.

However, when effecting the advantageous catalytic reforming operation with platinum-alumina catalysts containing combined halogen for the conversion of stocks containing relatively high amounts of contaminants, there results a certain degree of selective poisoning of the catalyst and a decrease in the activity thereof.

It is, therefore, an object of this invention to remove the harmful contaminants from a reformer feed stock prior to the introduction of the feed stock into a reformer, thereby preventing the deactivation of the reforming catalyst.

It is a particular object of this invention to provide a process and apparatus for effecting the catalytic removal of contaminants from a gasoline fraction in order to prevent the contamination of the catalyst used in a subsequent reforming operation.

It has been found that the most common contaminants contained in a reformer feed stock are combined sulfur and combined nitrogen. When the feed stock contacts the reforming catalyst at reforming conditions, the combined sulfur and nitrogen are freed from the hydrocarbon molecule and are adsorbed on the catalytic surfaces, or in some other way reduce the activity of the catalyst. To eliminate this difficulty it has been found that by contacting the feed stock with a suitable catalyst at suitable conditions in the presence of hydrogen, the combined sulfur and nitrogen are hydrogenated to hydrogen sulfide and ammonia. It is necessary after this hydrogenation has been effected to separate the resultant hydrogen sulfide and ammonia from the feed stock prior to introducing the feed stock into a reforming operation. Although the pre-treating process produces a reformer feed stock that is substantially of the same composition as the feed stock to the pre-treater with respect to all components except sulfur and nitrogen, it has been found that a very small amount of heavier hydrocarbon material is formed. It has further been found that this extremely small amount of heavier material causes a large quantity of coke to be laid down on the reforming catalyst and thereby causes the rapid deactivation of the reforming catalyst. It has also been found that hydrogen sulfide and ammonia, if not completely separated from the purified feed stock, will cause the deactivation of the reforming catalyst.

It is therefore an embodiment of this invention to contact a feed stock containing contaminants with a catalyst which effects the hydrogenation of combined sulfur and combined nitrogen contained therein to produce hydrogen sulfide and ammonia, and to effectively separate the resultant hydrogen sulfide and ammonia from the feed stock prior to introducing the feed stock into a reforming operation, and to further remove heavy ends produced in the pre-treating operation or otherwise present in the feed stock prior to introducing the pretreated feed stock into a subsequent reforming operation.

In a more specific embodiment the present invention relates to a process and apparatus for the removal of contaminants from a reformer feed stock which comprises pre-heating the feed stock and introducing the pre-heated feed to a pre-treating zone wherein it is contacted with a hydrogenating catalyst in the presence of hydrogen, thereby effecting the reactions of hydrogenating combined sulfur and nitrogen to hydrogen sulfide and ammonia, subsequently passing the effluent stream from the pre-treating zone reducing the pressure on the effluent and passing it to a flash chamber, separating in the flash chamber a gaseous phase comprising hydrogen sulfide, ammonia, hydrogen, and light hydrocarbons, and a liquid phase comprising the gasoline fraction and heavy ends, passing the liquid phase to the lower portion of a fractionator and passing the gaseous phase to the upper portion of the fractionator, applying heat to the lower portion of the fractionator, thereby producing an ascending vapor stream which countercurrently contacts a descending liquid stream on contacting plates disposed horizontally in the fractionator, removing an overhead stream from the upper portion of the fractionator, cooling and partially liquifying the overhead stream and collecting the liquid portion in a receiver, passing a portion of the liquid portion of the overhead stream back to the upper portion of the fractionator as a reflux, and separately withdrawing the gaseous portion of the overhead stream. At an intermediate portion of the fractionator a collection tray is placed so that it is below the upper feed point, and above the lower feed point. The material collected on this collection tray is the reformer charge stock. A bottoms stream is taken from the lower portion of the fractionator and comprises the heavy bottoms formed in the pre-treating operation or otherwise present. The advantage of this particular flow is that it provides a means of obtaining a reformer charge stock that is free both of contaminants and of heavy ends.

The process of this invention may best be explained with reference to the accompanying drawing which illustrates diagrammatically one embodiment of this invention and is no way intended to limit the invention to the particular process or apparatus illustrated.

Referring now to the drawing, a reformer charge stock containing undesired contaminants enters line 1 and passes through heat exchanger 2 and therefrom passes to line 4, wherein it is commingled with a hydrogen-containing gas entering line 4 through line 3, the commingled stream in line 4 is heated to reaction temperature in heater 5 and passes therefrom to pre-treater 6, wherein the commingled stream is contacted with a hydrogenating catalyst at hydrogenating conditions and the desired reactions are effected. The reactor effluent stream containing purified reformer feed stock, hydrogen sulfide, ammonia, and a small quantity of heavy ends passes from pre-treater 6 through line 7 to the before mentioned heat exchanger 2 wherein it is in indirect heat exchange with the incoming charge stock. From heat exchanger 2 the reactor effluent stream passes through valve 8' wherefrom it is throttled through line 8 into flash chamber 9. In flash chamber 9 a partial separation of the reactor effluent stream is effected, with the lighter components of the stream entering the gaseous phase while the heavier components remain in the liquid phase. The gaseous phase in flash chamber 9 comprises hydrogen, hydrogen sulfide, ammonia, and lighter hydrocarbons, while the liquid phase comprises the gasoline fraction and heavy ends. The gaseous phase from flash chamber 9 passes through line 12 and pressure control valve 13 into the upper portion of fractionator 14. The liquid phase in flash chamber 9 passes through line 10 and level control valve 11 and enters the lower portion of fractionator 14. The liquid phase from line 10 descends through fractionator 14 over contacting plates 17 whereon it is contacted with an ascending gas stream produced by vaporizing the hydrocarbons in the lower portion of fractionator 14 by means of heat supplied by reboiler 16. The ascending gas stream passes into the upper portion of fractionator 14. The gaseous phase from line 12 enters the upper portion of fractionator 14 as an ascending gas stream and it is contacted with a descending liquid stream from line 23. The ascending gas stream resulting from the fractionation of both streams passes overhead through line 20 and into cooler 21, wherein a portion of the overhead stream is liquefied, the liquid collecting in the lower portion of receiving vessel 22, a portion of the liquid being returned to the fractionator as the before mentioned descending liquid stream. The gaseous portion of the overhead stream is vented through line 25 and pressure control valve 26. Collection tray 15 disposed between the feed points where lines 10 and 12 enter fractionator 14 collects a fraction containing neither light gases nor heavy ends, which is particularly suitable as a reformer feed stock.

Control valve 8' is for the purpose of reducing the pressure of the pre-treater effluent stream so that there will be a more efficient separation in the flash chamber. Control valve 8' is actuated by pressure fluctuations in line 8 which connects the pre-treater to control valve 8'. Pressure control valve 13 is for the purpose of reducing the pressure of the gaseous stream from flash chamber 9 to fractionator 14. Pressure control valve 13 is actuated by pressure fluctuations in flash chamber 9. Level control valve 11 is for the purpose of controlling the liquid flow from flash chamber 9 to fractionator 14. Level control valve 11 is actuated by fluctuations in the level maintained in flash chamber 9. Pressure control valve 26 is for the purpose of maintaining a pressure in fractionator 14. This valve is actuated by fluctuations in the pressure maintained in receiver 22. Although it is shown in the diagram that these valves are connected directly to the control points it is, of course, understood that the use of instrumentation for the various functions performed by the valves will not change the basic process. It is, of course, understood that for particular conditions of operation several of the valves may be eliminated, as for example, when flash chamber 9 and fractionator 14 are both run at atmospheric pressure, valves 13 and 26 are not required for efficient operation.

It is contemplated that for specific processes minor modifications of the apparatus as hereinbefore described may be made without removing the modified apparatus from the broad scope of this invention. Some of the modifications may be: (1) various heat exchange schemes between the various streams to reduce the energy requirements for operating the plant, (2) various means of effecting an intimate contact of the ascending and descending streams in the fractionator, as for example, any of the conventional deck plates, perforated plates, bubble cap plates, and/or column packings, etc., (3) various arrangements of valves and pumps to be consistent with the pressure levels maintained in various portions of the plant, (4) the pretreating reactor may be operated with up-flow or downflow or with various means of introducing charge stock and hydrogen-containing gases, etc.

Any suitable hydrogenation catalyst may be used in the pre-treating zone including nickel, platinum, copper, molybdenum, palladium, etc., compounds of the above mentioned metals, including their oxides and sulfides, or any combination thereof. The catalyst may be used alone or composited with other materials including silica, alumina, magnesia, zirconia, thoria, zinc oxide, kieselguhr, diatomaceous earth, bauxite, etc., or any combination thereof. The catalyst used and conditions of operation in the treating zone will depend on the charge stock characteristics and the treatment to be effected. The pretreating zone may be operated at a temperature of from about 450° F. to about 900° F. or more and at a pressure of from atmospheric to 1000 pounds per square inch or more. The fractionator may be operated at any pressure consistent with the characteristics of the material to be fractionated.

In a preferred embodiment the treating zone will contain a catalyst which is a sulfided composite of cobalt, molybdenum, and alumina. When using this catalyst the preferred operation of the treating zone is at a temperature of from about 550° F. to about 800° F. at a pressure of from about 300 p. s. i. to about 700 p. s. i. At the preferred conditions as set forth there will be substantially no conversion of the charge stock other than the hydrogenation of the contaminants, which will be effected to a large degree. In the subsequent reforming zone the reforming catalyst is preferably a composite of platinum-alumina and combined halogen and the preferred operation is at a temperature of from about 600° F. to about 1000° F. and at a pressure of from about 300 p. s. i. to about 900 p. s. i.

It may be seen from the drawing and specifications that the process of this invention is particularly advantageous in that it affords a means of producing a purified feed stock for a reforming operation. When using a conventional fractionator having one feed point it may be seen that the reformer reactor charge must either be taken off of the fractionator bottom or as a side cut, which is withdrawn at a point intermediate in the column. If the side cut is taken off below the feed point, then the reformer charge stock must necessarily contain the heavy ends produced in the pre-treating process because the descending liquid stream runs into the collecting tray. If the side cut is taken off above the feed point, then the reformer charge will contain the amount of hydrogen sulfide and ammonia that is in equilibrium with the feed stock at the pressure and temperature conditions at the side cut draw off point. It may therefore be seen that a conventional fractionator can, at best, make only a partial separation and thereby produces a reformer feed stock that is only partially free of contaminants. The process of this invention provides for two feed points, one above the side cut tray and one below. The upper feed point charges to the fractionator virtually all of the contaminants as an ascending gaseous phase, thereby eliminating the contaminants from the section of the column at which the reformer charge is drawn off. The lower feed point charges to the fractionator virtually all of the gasoline fraction and in addition all of the heavy ends as a descending liquid stream. Through this operation only pure products in the gasoline fraction are collected on tray 15 and at the same time all the heavy ends are collected in the fractionator reboiler and all of the contaminants are taken overhead.

The hydrogen-containing gas to the pre-treater may be vent gas from the subsequent reforming process or it may be a combination of vent gas and fractionator overhead gas which may be purified and recycled to the pre-treater. Since the catalyst in the pre-treating zone must necessarily be sulfur resisting, the contaminants contained in the fractionator overhead gas should not unduly de-activate the pre-treating catalyst. In a preferred operation using the preferred catalyst and conditions there will be sufficient hydrogen made in the reforming process to more than adequately fill the needs of the pre-treater.

Following are seven examples included to illustrate the process of this invention but not intended to limit the invention to the materials or methods of the examples. Each example illustrates the use of the preferred catalyst for desulfurizing a different feed stock. The catalyst used in all examples is a sulfied composite of 2.5 weight percent cobalt and 2.5 weight percent molybdenum on alumina. The feed stocks used in each example are set forth in Table I below.

Table I

Example I: Mid-Continent straight run naphtha.
Example II: Oklahoma straight run naphtha.
Example III: California straight run naphtha.
Example IV: Kuwait straight run naphtha.
Example V: Santa Maria coker distillate.
Example VI: Oklahoma cracked naphtha.
Example VII: California cracked naphtha.

The pertinent charge stock characteristics and the process conditions used are set forth in each example in Table II below. The figures tabulated are laboratory inspections of reformer charge stock and various operating conditions and charge stock characteristics.

Table II

| Example No. | I | II | III | IV | V | VI | VII |
|---|---|---|---|---|---|---|---|
| Charge Stock | Mid-Continent S. R. Naphtha | Okla. S. R. Naphtha | Calif. S. R. Naphtha | Kuwait S. R. Naphtha | Santa Maria Coker Distillate | Okla. Cracked Naphtha | Calif. Cracked Naphtha |
| Sulfur in Charge, wt. percent | 0.04 | 0.011 | 0.141 | 0.078 | 2.61 | 0.12 | 1.28 |
| Temperature, °F | 605 | 600 | 600 | 635 | 750 | 600 | 750 |
| Pressure, p. s. i. g | 800 | 800 | 800 | 800 | 800 | 800 | 500 |
| LHSV | 5 | 5 | 5 | 5 | 2 | 2 | 2 |
| Hydrogen, c. f./bbl | 250 | 20 | 200 | 200 | 750 | 500 | 1000 |
| Sulfur in effluent, wt. percent | 0.0029 | 0.0033 | 0.0025 | 0.0011 | 0.088 | 0.03 | 0.0115 |
| Percent desulfurization | 93 | 70 | 98 | 99 | 97 | 75 | 99+ |

From the examples it can be seen that the process of this invention is very flexible and may be used to treat a range of stocks having widely different characteristics. The process variables can be adjusted to effect any degree of desulfurization desired, either percent-wise or the absolute quantity. It may be noted from Example II that by using mild operating conditions and a low amount of hydrogen, the Oklahoma straight run naphtha's sulfur was reduced to a tolerable quantity, although the percent-wise sulfur removal was not comparable to that of the other examples. A tolerable quantity is a quantity of sulfur that may be in the reformer charge stock without substantially effecting the activity of the reforming catalyst. The sulfur remaining in the charge stock after pre-treating in all of the above examples is well within the tolerable range for reforming catalysts.

It may be noted that additional hydrogen is used when treating cracked stocks. This additional hydrogen is that necessary to saturate the olefins contained in the cracked stocks. The saturation of olefins is advantageous because olefins, when subjected to reforming conditions, tend to form coke on the reforming catalyst and thereby reduce its activity.

In all of the above examples nitrogen removal was substantially complete. In all examples the pretreating process as hereinbefore set forth when combined with a reforming process produced a high yield of high octane motor fuel, and the reforming catalyst activity was maintained for a period substantially longer than when used for reforming contaminated untreated stocks.

I claim as my invention:

1. A process for the purification of hydrocarbon distillate boiling predominantly in the gasoline range and containing sulfur and nitrogen contaminants, which comprises contacting said distillate with a hydrogenation catalyst in the presence of hydrogen at a temperature of from about 450° to about 900° F., flashing the resultant products and separating the same into a gaseous phase comprising hydrogen sulfide, ammonia, hydrogen and light hydrocarbons and a liquid phase of gasoline boiling hydrocarbons and heavy ends, introducing said gaseous phase into the upper portion of a fractionating zone having a condensate collecting tray in a lower intermediate portion thereof, contacting the gaseous phase with refluxing liquid in the upper portion of said zone, introducing said liquid phase to the fractionating zone below said collecting tray and vaporizing gasoline boiling hydrocarbons therefrom in the lower portion of said zone below the tray, condensing the vapors in said upper portion of the fractionating zone and collecting resultant gasoline condensate on said tray, removing said condensate from the tray and from the intermediate portion of the fractionating zone, and removing the unvaporized heavy ends of the liquid phase from the lower portion of said zone.

2. A process for the purification of hydrocarbon distillate boiling predominantly in the gasoline range and containing sulfur contaminants, which comprises contacting said distillate with a hydrogenation catalyst in the presence of hydrogen at a temperature of from about 450° to about 900° F., flashing the resultant products and separating the same into a gaseous phase comprising hydrogen sulfide, hydrogen and light hydrocarbons and a liquid phase of gasoline boiling hydrocarbons and heavy ends, introducing said gaseous phase into the upper portion of a fractionating zone having a condensate collecting tray in a lower intermediate portion thereof, contacting the gaseous phase with refluxing liquid in the upper portion of said zone, introducing said liquid phase to the fractionating zone below said collecting tray and vaporizing gasoline boiling hydrocarbons therefrom in the lower portion of said zone below the tray, condensing the vapors in said upper portion of the fractionating zone and collecting resultant gasoline condensate on said tray, removing said condensate from the tray and from the intermediate portion of the fractionating zone, and removing the unvaporized heavy ends of the liquid phase from the lower portion of said zone.

3. A process for the purification of hydrocarbon distillate boiling predominantly in the gasoline range and containing nitrogen contaminants, which comprises contacting said distillate with a hydrogenation catalyst in the presence of hydrogen at a temperature of from about 450° to about 900° F., flashing the resultant products and separating the same into a gaseous phase comprising ammonia, hydrogen and light hydrocarbons and a liquid phase of gasoline boiling hydrocarbons and heavy ends, introducing said gaseous phase into the upper portion of a fractionating zone having a condensate collecting tray in a lower intermediate portion thereof, contacting the gaseous phase with refluxing liquid in the upper portion of said zone, introducing said liquid phase to the fractionating zone below said collecting tray and vaporizing gasoline boiling hydrocarbons therefrom in the lower portion of said zone below the tray, condensing the vapors in said upper portion of the fractionating zone and collecting resultant gasoline condensate on said tray, removing said condensate from the tray and from the intermediate portion of the fractionating zone, and removing the unvaporized heavy ends of the liquid phase from the lower portion of said zone.

References Cited in the file of this patent

UNITED STATES PATENTS

| | | |
|---|---|---|
| 2,464,539 | Voorhies et al. | Mar. 15, 1949 |
| 2,484,381 | Johnson et al. | Oct. 11, 1949 |
| 2,498,559 | Layng et al. | Feb. 21, 1950 |
| 2,614,066 | Cornell | Oct. 14, 1952 |
| 2,691,623 | Hartley | Oct. 12, 1954 |